United States Patent [19]

Parquier et al.

[11] 3,792,478

[45] Feb. 12, 1974

[54] PHASE CONTROL CIRCUIT

[75] Inventors: Guy Le Parquier; Marie-Jacques Jullien, both of Paris, France

[73] Assignee: Thomson-CSF, Paris, France

[22] Filed: Dec. 7, 1970

[21] Appl. No.: 95,494

[30] Foreign Application Priority Data

Dec. 24, 1969 France .............................. 6944909

[52] U.S. Cl. ............... 343/100 SA, 331/12, 331/18, 331/25

[51] Int. Cl. ............................................. H04b 7/00

[58] Field of Search .................. 331/12, 18, 25, 27; 343/100 SA, 854

[56] References Cited

UNITED STATES PATENTS

| | | | |
|---|---|---|---|
| 2,774,872 | 12/1956 | Howson | 331/27 |
| 3,101,448 | 8/1963 | Costas | 331/12 |
| 3,588,734 | 6/1971 | Welti | 331/25 |
| 3,600,700 | 8/1971 | Matsuo | 331/12 |

*Primary Examiner*—Maynard R. Wilbur
*Assistant Examiner*—S. C. Buczinski
*Attorney, Agent, or Firm*—Edwin E. Greigg

[57] ABSTRACT

A circuit for controlling the phase of the output signal produced by an oscillator, by that of a reference signal, while imposing any desired phase shift between the two signals, comprises means for feeding to the oscillator, as control signal, a signal which is a weighted sum of the sine and of the cosine of the phase difference between the oscillator output signal and the reference signal; the weighting coefficients are determined by the value of the desired phase-shift; the sine and cosine are supplied by a conventional phase detecting means.

11 Claims, 7 Drawing Figures

Inventors
Guy Le Parquier &
Marie-Jacques Jullien
by Edwin E. Greigg Atty

PHASE CONTROL CIRCUIT

The present invention relates to phase control circuits and more particularly to a circuit for locking the output signal of an oscillator to that of a reference signal, while insuring the possibility of controlling the relative phase-shift between these signals.

Circuits for locking the phase of an oscillator to that of another signal are well known; such circuits can generally be used for adjusting the phase-shift between the two signals concerned. To this end it suffices to arrange a variable phase-shifter in the circuit.

While the use of such phase-shifters is hardly a problem at low an medium frequencies, the situation is quite different in the microwave band. In this case, phase-shifters are rather complex systems comprising ferrite components and diodes and generally permit only of quantized phase-shifts, the complexity being the greater as the quantizing step is smaller.

It is also possible to produce a phase-shift between the reference signal and the controlled signal by adding to the error signal, in the feedback loop, a variable voltage or current (depending upon the nature of the error signal), but this method, besides the fact that it calls for a variable auxiliary source, does not enable the phase-shift to be defined with any degree of precision.

It is an object of the invention to obviate the need to use phase-shifters whilst at the same time enabling the phase to be adjusted precisely.

According to the invention, there is provided a circuit for controlling the phase of the signal produced by an oscillator having a control input by that of a reference signal, with control of the desired relative phase between the two signals, said circuit comprising a reference signal input, an oscillator having a control input, a first phase detection means having two inputs for receiving respectively said signals and an output, said first means supplying a signal proportional to the sine of the difference between the instantaneous phases of said two signals when the latter are sinusoidal, said circuit further comprising a second phase detection means having two inputs for receiving respectively said signals and an output, said second means supplying a signal proportional to the cosine of the difference between the instantaneous phases of said two signals when the latter are sinusoidal, weighting and summing means having two inputs respectively coupled to said detection means outputs, and an output coupled to said oscillator control input, said weighting and summing means having two weighting control inputs for receiving respective weighting control signals.

For a better understanding of the invention and to show how the same may be carried into effect reference will be made to the drawings accompanying the ensuing description and in which.

Figure 1:
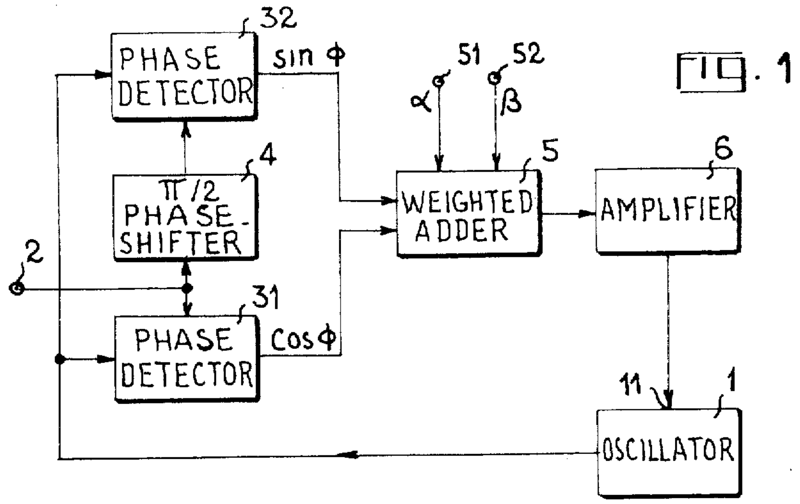
FIG. 1 is a block diagram broadly illustrating a circuit according to the invention.

The circuit in FIG. 1 comprises a controlled oscillator 1, which may be of any conventional type, capable of being controlled by a voltage or a current for example. In the X or Ku band it can comprise a transistor, a frequency multiplier and a varicap, the control signal then being a d.c. voltage applied across the varicap terminals. In FIG. 1, the control signal is applied to the terminal 11 of the oscillator 1.

The reference signal, the origin of which depends of course upon the particular application concerned, is made available at the terminal 2.

Two phase detectors 31 and 32 receive the reference signal and that of the oscillator to be controlled. A $\pi/2$ phase-shifter 4 is inserted in one of the inputs of one of the phase detectors, say the detector 32, preferably the input coupled to the reference signal, so that the output signals of the two detectors are respectively proportional to the sine and cosine of the instantaneous phase difference $\phi$ between the two waves.

Where th oscillator produces a sine wave, the reference signal can take the form.

$$A = \sin 2\pi F t$$

provided that the time origin is appropriately chosen, and the signal to be controlled can take the form $$B = \sin[2\pi\,(F + \Delta F)\,t + \psi\,].$$

At an instant $t$, the instantaneous phase difference is given by $$\phi = [2\pi\,(F + \Delta\,F)\,t + \phi] - 2\pi F t = 2\pi\cdot\Delta F\cdot t + \phi$$

In known control systems with only one detection channel, providing for example a sin $\Phi$ signal, this sin$\Phi$signal is the error signal which, after amplification, controls the oscillator in order to virtually cancel out $\Phi$: the equality between the frequencies automatically results in equality between the phases, except if a phase-shifter is placed in one of the input channels of the detector.

However, in the present instance, two signals sin$\Phi$ and cos$\Phi$ are simultaneously used to produce the error signal for control.

To this end, they are combined in a weighted adder 5, which produces a signal $S = \alpha \cos\Phi + \beta \sin\Phi$, where $\alpha$ and $\beta$ are variable weighting coefficients which depend upon the control signals applied respectively to the inputs 51 and 52 of the adder unit 5, which is entirely conventional.

The signal S is amplified in a high-gain amplifier 6, and is used then as an error signal which controls the oscillator 1. The frequency of the latter is thus locked to the frequency F of the reference signal, the relative phase-shift $\psi$ being a function of $\alpha$ and $\beta$. The effect of the feedback loop in stabilized operation will be not that of rendering the instantaneous phase $[2\,\pi\,\Delta\,Ft + \phi]$ zero [it being assumed that one disregards the control error which, in principle, is unavoidable but which, as those skilled in the art will appreciate, is the smaller the higher the gain of the amplifier 6] as is the case if only sin $\phi$ is used for the control, but substantially equal to a value $\psi$ such that $\alpha \cos\psi + \beta \sin\psi$ is substantially zero, this obviously meaning that $\Delta F = 0$, the term varying with $t$ having to be zero, and $\phi = \psi$.

Figure 2:
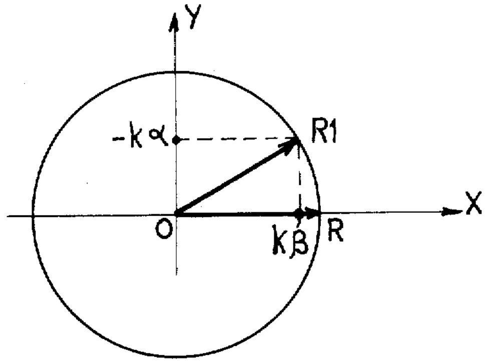
FIG. 2 is an explanatory diagram.

The diagram of FIG. 2 explains the operation of the arrangement shown in FIG. 1. When a state of balance is achieved, the oscillator signal is under the control, not of the reference signal (in polar coordinates of origin 0 and reference axis OX, the latter is represented by the vector $\vec{OR}$), but of the signal represented by the vector $\vec{OR}_1$, the phase $\psi$ of which, with respect to vector $\vec{OR}$, is determined by the relationship $\alpha \cos \psi + \beta \sin \psi = 0$, i.e. by the expression $\tan \psi = -(\alpha/\beta)$, disregarding of course the control error. The projections of $\vec{OR}_1$, onto OX and onto the OY axis perpendicular to OX, are thus equal to $\pm k\,\beta$ and $-k\,\alpha$, $k$ being proportionally coefficient equal to $[1/(\alpha^2 + \beta^2)^{1/2}]$ in the case illustrated ($|\vec{R}| = |\vec{R}_1| = 1$).

The following table lists the value of $\alpha$ and $\beta$ (with the exception of a proportionality coefficient), for a few values of $\psi$:

| $\alpha$ | $\beta$ | $\psi$ |
|---|---|---|
| 0 | +1 | 0 |
| −1 | $\sqrt{3}$ | $\pi/6$ |
| −1 | +1 | $\pi/4$ |
| $-\sqrt{3}$ | +1 | $\pi/3$ |
| −1 | 0 | $\alpha/2$ |
| 0 | −1 | $\pi$ |
| +1 | 0 | $3\pi/2$ |
| +1 | −1 | $5\pi/4$ |
| 0 | +1 | $2\pi$ |

Figure 3:
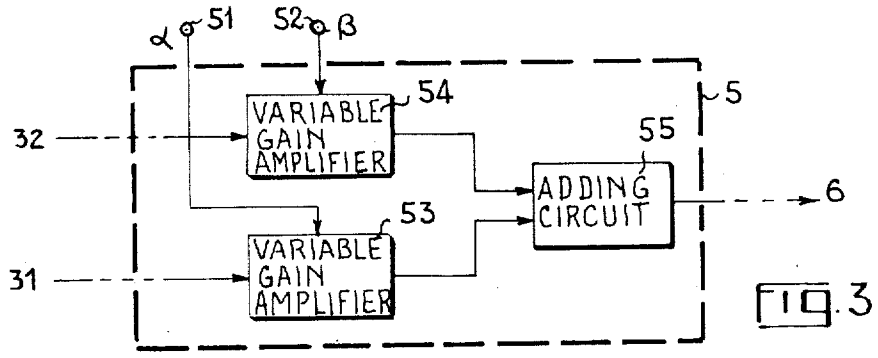
FIGS. 3 and 4 illustrate embodiments of one of the elements of the circuit of FIG. 1.

The design of the weighting unit 5 essentially depends upon the particular application envisaged. The unit is in itself quite conventional, being nothing more than a circuit for multiplying two signals by variable coefficients and then effecting the sum of the two products thus obtained. It may be formed by two controlled variable-gain amplifiers 53 and 54, or by potentiometers, followed by adding circuit 55 as shown in FIG. 3, the control of the phase-shift then being continuous.

Figure 4:
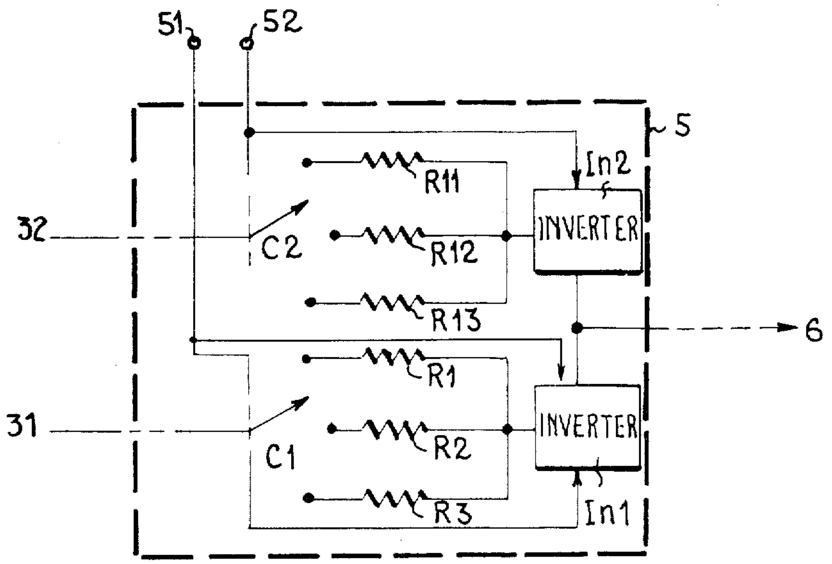

For a stepwise control of the phase, identical pairs of resistors $R_1$, $R_{11}$; $R_2$ $R_{12}$ ; . . . . . . $R_n$, $R_{1n}$ ; can be employed, as shown in FIG. 4, where n is made equal to three by way of example. They are associated as shown in the figure with switches $C_1$ and $C_2$, for example semi-conductor switches of the MOS, diode or transistor type. $In_1$ and $In_2$ are inverters controlled by $\alpha$ and $\beta$, as are switches $C_1$ and $C_2$.

Of course, the arrangement described does not require the signal to be sinusoidal; accordingly the detectors will not necessarily produce sine and cosine functions but continuous functions, whose zeros, minima and maxima occur at the same time as in the respective sine and cosine functions; for example squarewave signals or triangular signals made up of successions of linear function elements.

A characteristic of the control arrangement described is that not only it involves no phase-shifter, but also that, however high the oscillator frequency to be controlled, the phase control circuit 5 operates only on relatively low-frequency signals at the most equal to the difference $\Delta F$.

The arrangement of the invention may have numerous applications, such as, for example, phase measurements under laboratory conditions (it is then sufficient, since the oscillator 11 is then independent, to close the feed-back loop on the $\alpha$ or $\beta$ control) or generally as a phase-shifter. A particularly significant application is one relating to electronic-scan microwave antennas of the kind employing active modular elements, that is to say comprising a network of radiator elements, means for varying the phase-shift between these elements and microwave power source associated with each other.

In known antennas of this kind, each element comprises a variable phase-shift element arranged at the output of the power source or in its control circuit, all the modular oscillators being synchronized in frequency and phase by a low-power pilot oscillator. For a detailed description of various prior art modes of feeding the elements of electronic-scan microwave antennas of the type utilizing active modular elements, reference can be had to the text RADAR HANDBOOK by Merrill Skolnick, published by McGraw-Hill Publishing Company, New York, New York copyright 1970. Page 11-6 of the HANDBOOK illustrates a typical antenna comprising a network of radiating element, with feeding means for each of the radiating elements. In order to have a particular direction, the elements radiate waves of the same frequency but having different phase angles. Pages 11-52 and 11-53 of the HANDBOOK, FIGS. 37 and 38, describe and illustrate various different modes of feed of the radiating elements using a single generator and utilizing an individual phase shifter associated with each of the radiating elements. However, phase-shift elements, particularly in the microwave range, have a certain number of drawbacks, in particular their power consumption, phase discontinuities and a size which rapidly becomes prohibitive if the quantizing step is to be reduced.

It is sufficient to replace the conventional modular oscillator control circuits by circuits in accordance with the diagram of FIG. 1.

Figure 5:
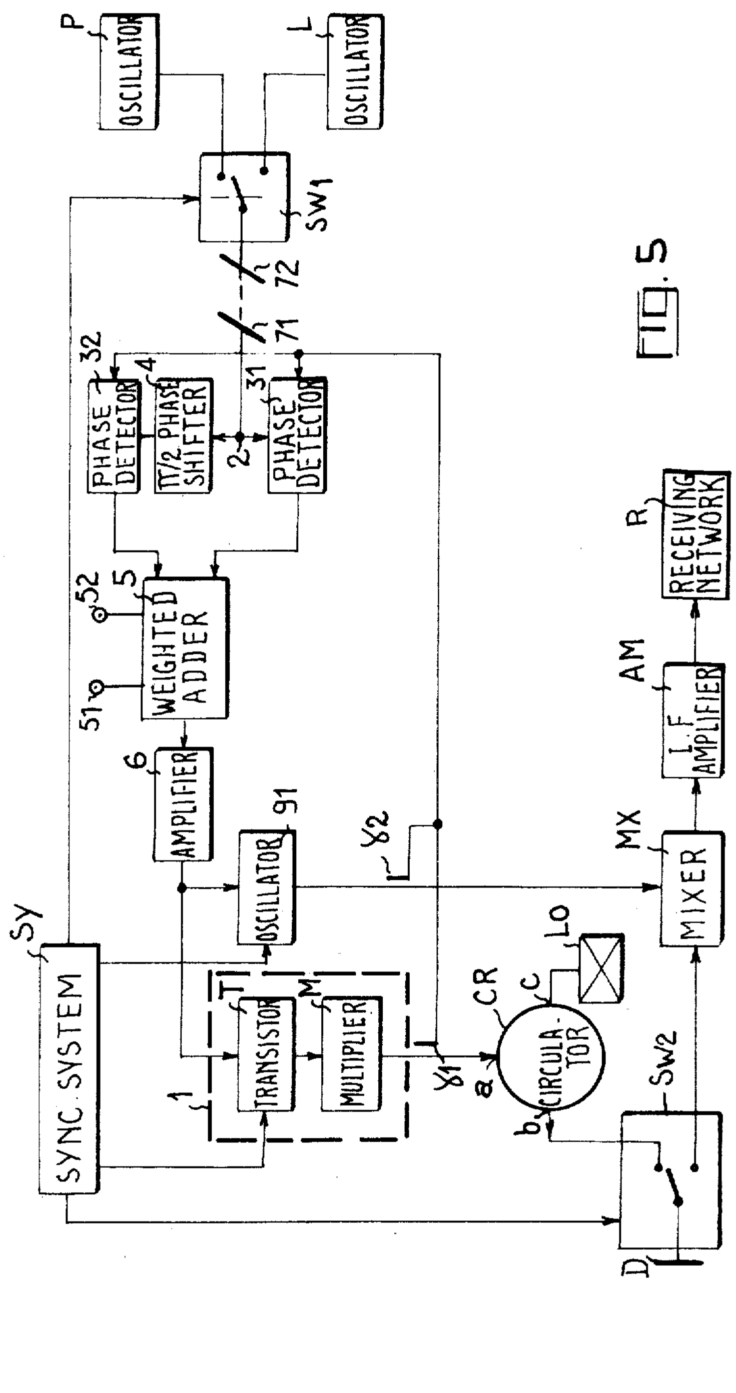
FIGS. 5 and 6 illustrate in block diagram form two applications of a circuit in accordance with the invention, and FIG. 7 illustrate in block diagram an electronic-scan modular antenna embodying circuits in accordance with the invention.
Figure 6:
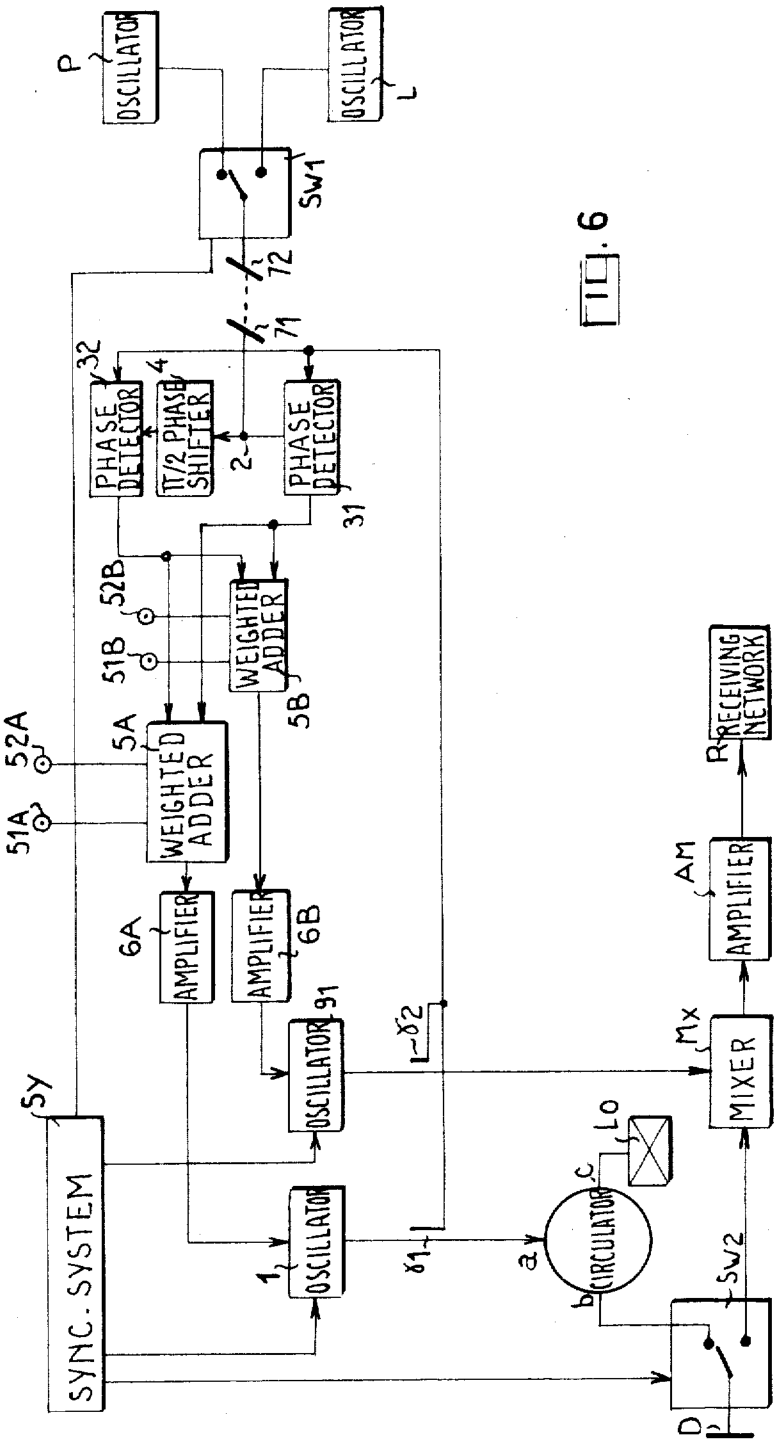

FIGS. 5 and 6 provide example of improved active modular antenna elements in accordance with the invention. The same reference numbers or letters designate the same elements in both figures and in FIG. 1.

The example shown in FIG. 5 relates to the case in which the phase of the transmitter oscillator 1, and that of the local heterodyne receiver oscillator 91, are identical.

The reference signal is applied to the terminal 2 either trough a transmission line or by radiation as shown here, the dipole 72 being coupled by radiation to a dipole 71 and thereby either to a transmission pilot oscillator P or to a reception pilot oscillator L, depending upon the position of the switch $Sw_1$.

In this case, the reference signal applied to the terminal 2 is provided either by the transmission pilot oscillator P or by the reception pilot oscillator L, depending on the position of the switch $Sw_2$.

The modular transmitter oscillator 1, for example an oscillator with a transistor T followed by a diode multiplier M, is coupled to the terminal *a* of the circulator CR·A microwave coupler, $\gamma_1$, picks up a small fraction of the signal from the oscillator, for the detectors, 31 and 32. The local receiver oscillator 91 is coupled to one of the inputs of a mixer MX, a microwave coupler $\gamma_2$ picking up a small fraction of the local oscillator signal for the phase detectors 31 and 32 and the oscillators 1 and 91 being alternately unblocked by the signals from the antenna general Sync.System Sy which are applied to their blocking inputs synchronously with the operation of the switch $Sw_1$.

On transmission, the pilot oscillator P illuminates the dipole 71 and the oscillator 1 is unblocked; the signal of the oscillator 1, which is controlled by that of the pilot and phase-shifted by the selected values $\alpha$ and $\beta$, passes from the terminal *a* to the terminal *b* which is connected to the switch $Sw_2$ (for example a diode assembly TR-ATR diode switch which is synchronised with the switch $Sw_1$), and is coupled to the transmit/- receive dipole D of the module; the third terminal of the circulator is connected to a matched load Lo.

On reception, the switch $Sw_1$ couples the oscillator L to the dipole 72 and the switch $Sw_2$ couples the dipole D to the second input of the mixer MX which is followed by an intermediate frequency amplifier AM, which is in turn coupled to the receiving network R of the module assembly in any conventional manner.

In certain applications of modular antennas, in particular as radar antennas, it is necessary for the transmitter oscillator 1 and the local oscillator 91 to be out of phase by different amounts.

Since the time taken to calculate the values of the phases, for the assembly of modules making up the antenna, may be long, it is necessary to effect calculation of the two sets of coefficient $\alpha$ and $\beta$ for each module and apply them to two identical but independent weighting circuits in order that, at the time of the switching from transmission to reception, there should be virtually no loss of time.

FIG. 6 is an example of a block diagram of circuits corresponding to this case:

It differs from FIG. 5 only by the fact that the pahse detectors 31 and 32 feed simultaneously two weighting circuits 5A and 5B, respectively followed by amplifiers 6A and 6B coupled to the respective oscillators 1 and 91.

The modules described could obviously take a more sophisticated form than that illustrated, employing well known techniques; for example, the received signal could be applied to a parametric amplifier whose pumping input is supplied by a frequency doubler located at the output of the local oscillator, the amplified signal at the output of the amplifier being mixed then with the local oscillator signal and then processed in the manner shown in the figures.

Figure 7:
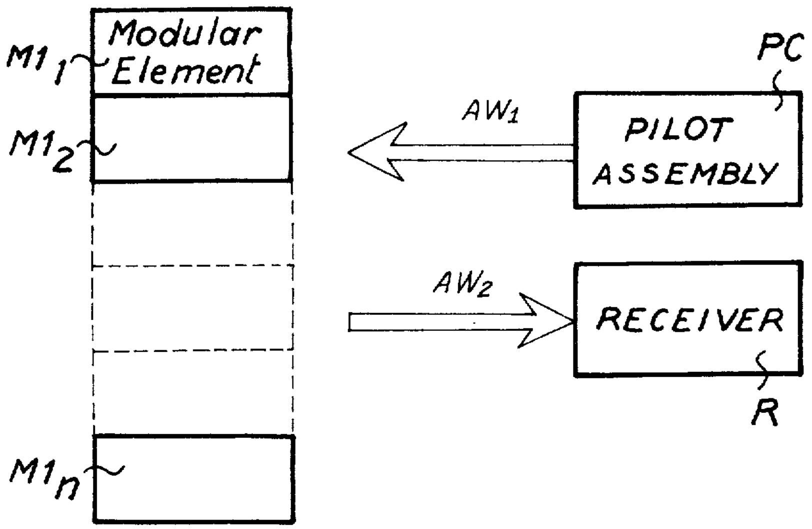

FIG. 7 is a block diagram of an electronic transmit-receive scan antenna according to the invention:

an array of np modular elements, $M_{11}$, $M_{in}$......$M_{pn}$ comprising phase control circuits according to the invention (only the column of the $M_{11}$.....$M_{1n}$elements is shown on the figure for the sake of clarity) is synchronised by a pilot assembly PC comprising for example the pilot oscillators P and L, the switch $SW_1$ and the radiating element 72 shown FIGS. 5 and 6.

The modular elements are built for example as shown in FIGS. 5 and 6, from radiator 71 to amplifier AM. The elements $M_{ij}$ ($i = 1,2....p$ and $j = 1,2....n$) are synchronized by the pilot assembly: the coupling of the latter to the modular elements is shown symbolically by the arrow $AW_1$ in FIG. 7: in this example, it is a radiation coupling; it might be of course a conventional coupling: in this latter case the radiating element 72 and the radiating elements such as 71 are deleted and transmission lines are used.

The intermediate frequency amplifiers of the modular elements such as AM FIGS. 5 and 6, are coupled to the antenna receiving system R: the arrow $AW_2$ in FIG. 7 represents symbolically this coupling, which may also be carried out through radiation provided suitable radiating elements are used, operating in a polarization mode different from that used for the coupling between the pilot assembly and the modular elements.

Of course, the invention is not limited to the embodiments described and illustrated, which are given only by way of example.

What is claimed is:

1. A circuit for controlling the phase of the signal produced by an oscillator having a control input, by that of a reference signal, with control of the desired relative phase between the two signals, said circuit comprising a reference signal input, an oscillator having a control input, a first phase detection means having two inputs for receiving respectively said signals and an output, said first means supplying a signal proportional to the sine of the difference between the instantaneous phases of said two signals when the latter are sinusoidal, said circuit further comprising a second phase detection means having two inputs for receiving respectively said signals and an output, said second means supplying a signal proportional to the cosine of the difference between the instantaneous phases of said two signals when the latter are sinusoidal, weighting and summing means having two inputs respectively coupled to said detection means outputs and an output coupled to said oscillator control input, said weighting and summing means having two weighting control inputs for receiving respective weighting control signals.

2. A circuit as claimed in claim 1 further comprising amplifying means inserted in series between said weighting and summing means output and said oscillator control input.

3. A circuit as claimed in claim 2 wherein said weighting and summing means comprise a first set of resistors having a first common terminal, a second set of resistors having a second common terminal, a first switch having a control input, a signal input coupled to said first detection means output, and an output selectively coupled to said resistors of said first set, a second switch having a control input, a signal input coupled to said second detection means output, and an output selectively coupled to said resistors of said second set, and a first and a second controlled inverters having respective control inputs and respective signal inputs coupled respectively to said first and second common terminals, and common outputs, said first switch and first inverter control inputs and said second switch and second inverter control inputs being coupled respectively to said weighting control inputs.

4. A circuit as claimed in claim 3 wherein said switches are built up by semiconductor matrices.

5. A circuit as claimed in claim 2 wherein said summing and weighting means comprise two variable gain amplifiers having respective control inputs respectively coupled to said weighting control inputs, respective signal inputs respectively coupled to said detection means outputs, and respective outputs, and adding means having two inputs respectively coupled to said variable gain amplifiers outputs.

6. An active modular element for an electronic scan antenna, comprising an oscillator having a control input and an output, a radiating element, means for coupling said radiating element to said output, a reference terminal for receiving a reference signal, a first phase detection means having two inputs respectively coupled to said output and to said reference terminal, and an output, said first means supplying a signal proportional to the sine of the difference between the instantaneous phases of the signals applied to its inputs when the latter are sinusoidal, a second phase detection means having two inputs respectively coupled to said output and to said reference terminal, and an output, said second means supplying a signal proportional to the cosine of the difference between the instantaneous phases of the signals applied to its inputs when the latter are sinusoidal, weighting and summing means having two inputs respectively coupled to said detection means outputs, and an output coupled to said oscillator control input, said weighting and summing means having two weighting control inputs for receiving respective weighting control signals.

7. An active modular element as claimed in claim 6 further comprising a further oscillator having a control input, and an output, means for selectively coupling said radiating element selectively to said oscillator outputs, means for further coupling said weighting and summing means output to said further oscillator control input, and frequency shifting means having two inputs respectively coupled to said further oscillator output and to said radiating element.

8. An active modular element as claimed in claim 6 further comprising a further oscillator having a control input, and an output, means for selectively coupling said radiating element selectively to said oscillator outputs, further weighting and summing means having two inputs respectively coupled to said detection means outputs, two weighting control inputs for receiving respective weighting control signals, and an output coupled to said further oscillator control input, and frequency shifting means having two inputs respectively coupled to said further oscillator output and to said radiating element.

9. An electronic transmit-receive antenna comprising pilot means supplying a reference signal, and active modular elements comprising an oscillator having a control input and an output, a radiating element, means coupling said radiating element to said output for supplying received signals thereto, a reference terminal for receiving said reference signal, each of said elements further comprising a first phase detection means having two inputs respectively coupled to said output and to said reference terminal, and an output, said first means supplying a signal proportional to the sine of the difference between the instantaneous phases of the signals applied to its inputs when the latter are sinusoidal, a second phase detection means having two inputs respectively coupled to said output and to said reference terminal, and an output, said second means supplying a signal proportional to the cosine of the difference between the instantaneous phases of the signals applied to its inputs when the latter are sinusoidal, weighting and summing means having two inputs respectively coupled to said detection means outputs, and an output coupled to said oscillator control input, said weighting and summing means having two weighting control inputs for receiving respective weighting control signals.

10. An electronic scan transmit-receive antenna as claimed in claim 9, each of said elements further comprising a further oscillator having a control input and an output, means for selectively coupling said radiating element to said oscillator outputs, means for further coupling said weighting and summing means output to said further oscillator control input, and frequency shifting means having two inputs respectively coupled to said further oscillator output and to said radiating element.

11. An electronic scan transmit-receive antenna as claimed in claim 9, each of said elements further comprising a further oscillator having a control input and an output, means for selectively coupling said radiating element to said oscillator outputs, further weighting and summing means having two inputs respectively coupled to said detection means outputs, two weighting control inputs for receiving respective weighting control signals, and an output coupled to said further oscillator control input, and frequency shifting means having two inputs respectively coupled to said further oscillator output and to said radiating element.

* * * * *